(12) United States Patent
Huang et al.

(10) Patent No.: US 8,885,876 B2
(45) Date of Patent: Nov. 11, 2014

(54) VISUAL TRACKING SYSTEM AND METHOD THEREOF

(75) Inventors: Cheng-Ming Huang, Taipei (TW); Yi-Tzn Lin, Taipei (TW); Li-Chen Fu, Taipei (TW); Pei-Yung Hsiao, Taipei (TW)

(73) Assignee: National Taiwan University (TW)

( * ) Notice: Subject to any disclaimer, the term of this patent is extended or adjusted under 35 U.S.C. 154(b) by 1713 days.

(21) Appl. No.: 12/203,165

(22) Filed: Sep. 3, 2008

(65) Prior Publication Data

US 2009/0262977 A1 Oct. 22, 2009

(30) Foreign Application Priority Data

Apr. 18, 2008 (TW) ................................ 97114336 A (51) Int. Cl.
*G06K 9/00* (2006.01)
*G06T 7/20* (2006.01)
*H04N 5/232* (2006.01)

(52) U.S. Cl.
CPC ...... *G06T 7/20* (2013.01); *H04N 5/232* (2013.01); *G06T 2207/10016* (2013.01)
USPC ........................................................ 382/103

(58) Field of Classification Search
CPC . G06T 2207/10016; G06T 7/20; H04N 5/232
USPC ........................................................ 382/103
See application file for complete search history.

(56) References Cited

U.S. PATENT DOCUMENTS

2002/0154791 A1* 10/2002 Onuma et al. ................. 382/103
2003/0099376 A1* 5/2003 Kim et al. ...................... 382/103

FOREIGN PATENT DOCUMENTS

| TW | I233061 | 10/2001 |
|----|---------|---------|
| TW | M290286 | 11/2004 |
| TW | 200744370 | 5/2006 |

OTHER PUBLICATIONS

Dae-Sik Jang, Active Models for tracking moving objects, Journal of Pattern Recognition 2000.*
Michael Kass et al, Snakes: Active Contour Models, IJCV 1988.*
Petros Maragos, Optimal Morphological Approaches To Image Matching and Object Detection, ICCV 1988.*

* cited by examiner

*Primary Examiner* — Chan Park
*Assistant Examiner* — Mark Roz
(74) *Attorney, Agent, or Firm* — Schmeiser, Olsen & Watts, LLP (57) ABSTRACT

The present invention provides a visual tracking system and its method comprising: a sensor unit, for capturing monitored scenes continuously; an image processor unit, for detecting when a target enters into a monitored scene, and extracting its characteristics to establish at least one model, and calculating the matching scores of the models; a hybrid tracking algorithm unit, for combining the matching scores to produce optimal matching results; a visual probability data association filter, for receiving the optimal matching results to eliminate the interference and output a tracking signal; an active moving platform, for driving the platform according to the tracking signal to situate the target at the center of the image. Therefore, the visual tracking system of the present invention can help a security camera system to record the target in details and maximize the visual information of the intruding target.

21 Claims, 6 Drawing Sheets

VISUAL TRACKING SYSTEM AND METHOD THEREOF

FIELD OF THE INVENTION

The present invention relates to a visual tracking system and its method, and more particularly to a system and a method of timely tracking an object by a combination of image characteristics.

BACKGROUND OF THE INVENTION

At present, the conventional video surveillance systems in the market comprise mainly the simple function of motion detection which can detect images by utilizing the principle of image subtraction. In other words, the method of the subtraction principle is based on a presumption that a camera and an image background are both in a motionless position, and the image intensities of corresponding pixels of two adjacent photos at a specific time is subtracted. If the result is greater than a user-defined threshold, then it would be considered as an indication of a moving object. However, one of disadvantages of this method is that the final result can be easily affected by the noises of the camera or the illumination changes of the environment. In addition, when the object is moving, the moving object (generally called a foreground) will cause a change in the image intensity, and, the background of the moving object also will cause a partial change in the image intensity. As a result, the subtraction result will contain both the foreground and the background, thus, the actual position of the foreground cannot be obtained. Further, when the object stops moving, the motion detection of the system cannot continue to locate the object resulting the loss of its detecting object. Moreover, since the camera must be fixed to a definite position, the viewing angle would be rigidly constrained and limited.

In applications of the conventional surveillance system, the real-time characteristic of the system is an important issue, and a standard camera can normally capture 30 frames per second. The tracking algorithm is not only required to track a target position accurately, but it is also needed to process the captured images immediately. In other words, the time required for processing an image should not exceed 33 milliseconds (ms), or else the computational burden of tracking algorithm will be heavily loaded that we have to reduce the number of captured images and the data volume of the system will be insufficient to resolve the foregoing problems. As a result, the tracking of the moving object will fail whenever the object is moving too fast.

In related prior arts as disclosed in R.O.C. Pat. Nos. I233061 and M290286, the conventional surveillance systems teaches of creating a target model either through the image intensity or the result of the image intensity undergoing different transformations, and then apply a template matching method to proceed the tracking process. However, the information of the image intensity is easily affected by various camera noises or the changes of illumination in various environmental conditions, in which can decrease the accuracy of the tracking rate drastically.

In addition, another prior art disclosed in R.O.C. Pat. Publication No. 200744370 simply teaches the usage of an image edge matching by assuming that a target contour is in a fixed elliptic shape, and using a fuzzy theory to control a platform in order to have smooth movements of the platform. Therefore, the conventional surveillance system utilizes the fuzzy theory for the purpose of controlling, but it cannot effectively improve the accuracy of the visual tracking of a target position. Further, the probability data association filter of the prior arts indicates that the conventional systems mostly use the trajectory of the object to predict and calculate the possible area of the target. However, any similar target falling in the possible area can be used for calculating a weighted average, so that if there is a possible result with a low score but close to the predicted position, the final tracking result will be affected significantly.

Therefore, we urgently need an improved tracking system and a method that can overcome the above-mentioned obstacles, such as the complicated background issue, the tracking difficulty caused by a change of illumination and how to track a target timely and accurately, such that if an object intrudes a video security system, the maximum information of the object can be recorded.

SUMMARY OF THE INVENTION

In view of the foregoing shortcomings of the prior art, the inventor of the present invention has based on years of experience in the related field to conduct extensive researches and experiments, and finally invented a visual tracking system and its method to overcome the shortcomings of the prior art.

Therefore, it is an objective of the present invention to provide a system and a method for timely tracking a target and integrate a plurality of image characteristics to reinforce each characteristic, so that when the target is partially occluded and/or has a low image contrast, the camera can still track the target successfully and timely.

To achieve the foregoing objective, the present invention provides a visual tracking system, comprising: a sensor unit, for continuously capturing a monitored scene; an image processor unit, coupled to the sensor unit, for detecting the entrance of a target in the monitored scene, extracting the characteristics of the target in the system to formulate at least one model of the target, and calculating a matching scores of the models; a hybrid tracking algorithm unit, coupled to the image processor unit, for integrating the matching scores to produce an optimal matching result; a visual probability data association filter, coupled to the hybrid tracking algorithm unit, for receiving the optimal matching result and eliminating the effect of a complicated background for the tracking process and outputting a tracking signal; and an active moving platform, for positioning the target at the center of the image according to the tracking signal.

To achieve the foregoing objective, the present invention provides a visual tracking method, comprising the steps of: (a) using a sensor unit to continuously capture an image in a monitored scene, and determine whether a target enters the monitored scene and then obtaining an initial location of the target; (b) extracting characteristics of the image to create at least one model of the target and calculating matching score of each model; (c) integrating the matching scores to produce a matching result; (d) using the matching result to eliminate an interference of tracking in a complicated background, outputting a tracking signal; and (e) driving a platform to move according to the tracking signal and situate the target at the center of the image.

To obtain accurate target initial location and contour (excluding the background) and use the results to formulate an accurate target model to faciliate the performance of a tracking system/method, the image processor unit of the invention uses binarization and morphological methods to determine whether or not a target enters into a monitored scene, and further uses a moving edge concept to extract characteristics of the image to create at least one model of the target.

To compensate the issues of an appearance change of the target captured by the sensor unit and a drop of the template model matching scores when the object is partially occluded, so that the system/method can still track the target successfully when the object is occluded partially, the present invention formulates a template model and an active contour model. The image processor unit calculates the matching scores of the template model by using the equation of the sum of absolute differences $$\sum_{i=1}^{M-1} \sum_{j=1}^{N-1} |I_1(x+i, y+j) - T(i, j)|$$

and the matching score of the active contour model by the equation of the gradient value summation $$\sum_{i=1}^{N_\sigma} \nabla \times I_2(x_c + x_i, y_c + y_i).$$

In order to successfully track the target, while the target is partially occluded and subjected to low image contrast, the present invention provides a method of using a fuzzy theory to combine the matching scores to produce a matching result.

To eliminate the influence of the similar areas of the target in a complicated background on the tracking effect, and to overcome the interference of the edge clutter generated by the complicated background, the present invention recites a novel method that its visual probability data association filter uses a motion difference between the target and the background to eliminate the interference of tracking in a complicated background.

To compensate the deplicit of a viewing angle of the sensor unit and continously tracking the moving target to obtain a maximum target information in the scene, the active camera platform of the invention uses the sensor unit and the transformation of spherical coordinates to formulate a motor motion method to situate the target at the center of the image.

Therefore, the present invention provides a visual tracking system and its method for recording a target in details to maximize the obtained information when a target intrudes a video security system.

DESCRIPTION OF THE PREFERRED EMBODIMENT

The above and other objects, features and advantages of the present invention will become apparent from the following detailed description taken with the accompanying drawing.

Figure 1:
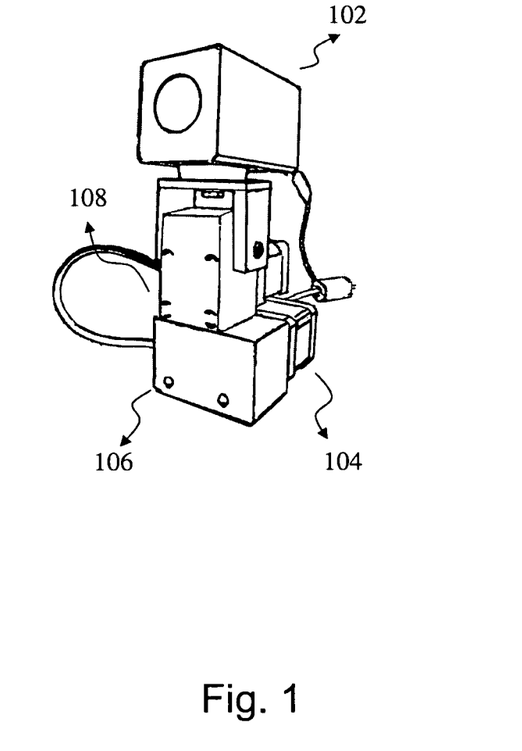
FIG. 1 shows a visual tracking system of the invention.

Referring to FIG. 1 for a schematic view of a visual tracking system in accordance with a preferred example of the invention, the visual tracking system comprises an image sensor unit 102, an active moving platform 104, a horizontal motor 106, an inclined motor 108, an image processor unit 110 (not shown in the figure), a hybrid tracking algorithm unit 112 (not shown in the figure), and a visual probability data association filter 114 (not shown in the figure). The image sensor unit 102 continuously captures images of a monitored scene. The flow chart of operating a tracking system is shown in FIG. 2 and described as follows.

Figure 2:
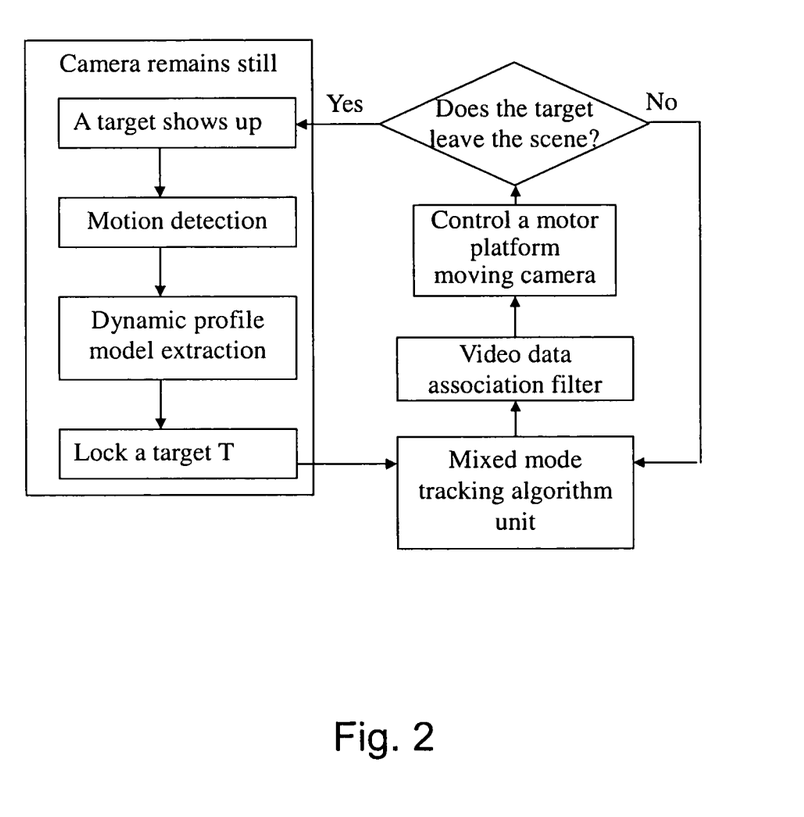
FIG. 2 shows a flow chart of operating a tracking system and its method in accordance with a preferred example of the invention.
Figure 3:
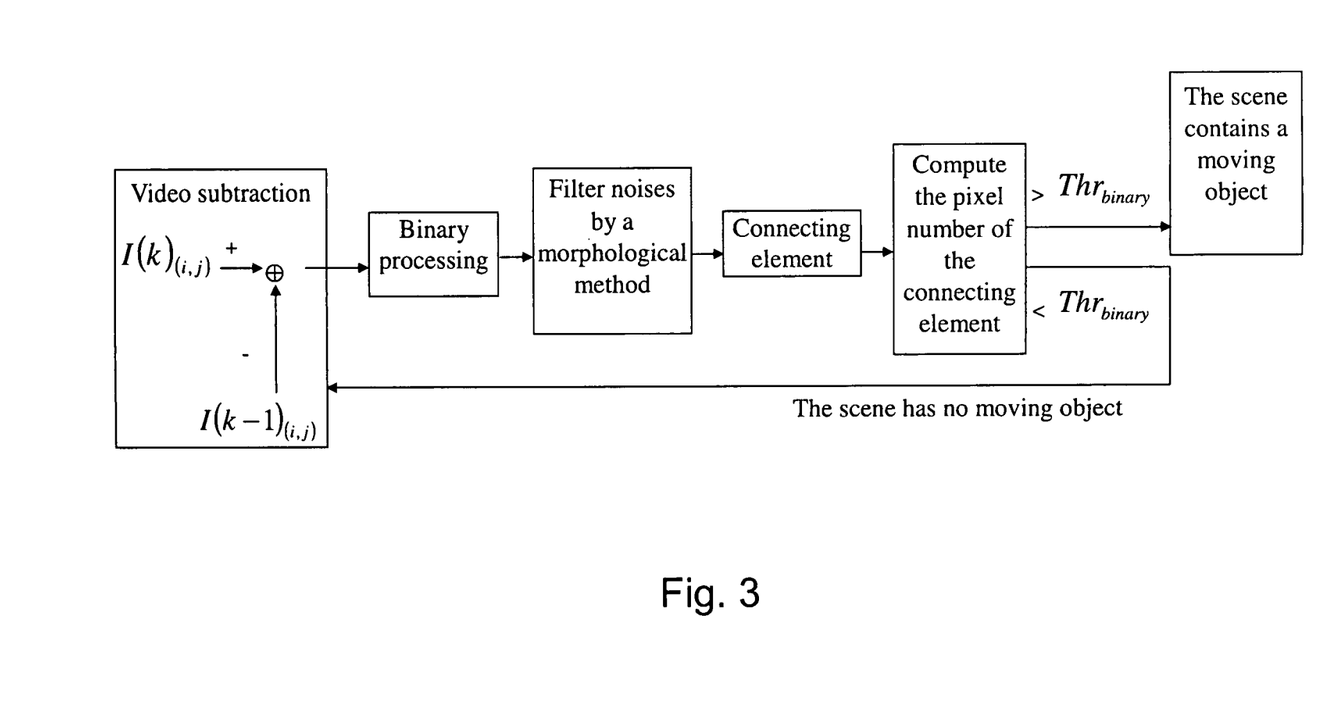
FIG. 3 shows a flow chart of determining whether or not there is a moving object in accordance with the preferred example of the invention.

Referring to FIG. 2 for a flow chart of operating a tracking system and its method in accordance with the preferred example of the invention, a target shows up, and the image processor unit 110 uses the sensor unit 102 to continuously capture two images and detect whether or not the target is moving according to an image subtraction principle as shown in FIG. 3. From the image subtraction principle, if the captured image includes no moving object, then the gray scale intensity of the image taken by the camera will remain unchanged. A change of image intensity is caused by a moving object, but an illumination alternation and a camera noise may also cause a change of image intensity. Therefore, the result of the subtraction of two images must go through a binarization method. In other words, if the gray scale intensity value of the pixel of the subtraction result is greater than the threshold of the gray scale intensity value of the image (which can be 100 to 150, and preferably 128 in this preferred example), and the gray scale intensity value of the pixel is set to 255, it will indicate a moving portion of the image. If the gray scale intensity value of the pixel of the subtraction result is smaller than or equal to the threshold of the gray scale intensity value of the image, then the gray scale intensity value of the pixel will be set to 0. The binary image is processed through a morphological method to eliminate the remained noise after the binary processing to obtain a connected component. If the pixel number of the connected component is smaller than a predetermined threshold of pixel number (which can be from 380 to 430, and preferably 400 in the preferred example), then it will be considered as there is no moving object in the image. When there is a determination of a moving object, then the system will initialize a template and an active contour model of the target for the tracking purpose. The connected component includes a background exposed after the object is removed. The present invention uses a moving edge concept to eliminate this portion to obtain an accurate object contour. In other words, an image and an edge detection of a second image are intersected, wherein the image is binarized and processed through the morphological method, to obtain an accurate initial location of the target.

Returning to FIG. 2, after the initial location of the target is obtained, the image processor unit 110 starts formulating models including a template model and an active contour model of the target, wherein the models can also include a contour model, a color model and a gray scale intensity value model, etc. The characteristics adopted in the invention include a gray scale intensity and an active contour. The template includes a gray scale image intensity in a bounding box of the target contour. Further, a moving edge result is used for initializing the active contour model.

The active contour model is a deformable closed curve represented by a function of a parameter s and convergent to an image edge by a minimal energy function method, and the energy function is defined as follows:

$$E^*_{Active\ Contour\ Model} = \int [E_{Internal\ Force}(v(s)) + E_{External\ Force}(v(s))] ds \quad (1)$$

In Equation (1), the energy function includes two portions: one of the portions is the internal force of the contour shape, in which the internal force determines the continuity and smoothness of the contour. The continuity is related to a first derivative of the curve, and the smoothness is related to a second derivative of the curve, and the equation can be rewritten as follows:

$$E_{Internal\ Force} = \tfrac{1}{2}(\alpha |v'(s)|^2 + \beta |v''(s)|^2) \quad (2)$$

An energy minimization of Equation (2) can assure that all contours of a human face do not have an acute angle, and are continuous. Another portion of the energy function is the external force affected by the gradient of the image. To obtain the obvious image edges, we usually process the image by a Gaussian filter first, and then minimize the internal force of Equation (2), such that the active contour model is convergent to the image edge when the image is updated. Even if the appearance of the contour is changed due to the motion of the target or the sensor unit, we can still obtain the most updated active contour model.

After the active contour model is extracted, the system will simultaneously match the contour and the score of the template matching. The system of the present invention is a real-time system, the time interval of capturing two successive images is only 33 milliseconds, therefore, the displacement of the target in the image will not be too large. Taking the computational efficiency into consideration, the system will use the target position at the previous moment as the center to create a search area, and the size of the search area is defined by the users. In the preferred example of the invention, the size of the search area is preferably 80×80 (and the size of the original image is 320×240). However, a too-large search area is unnecessary since it will waste computational resources.

Although the active contour model is a closed curved, but the obtained image is a digital image, thus the system of the invention actually uses a set of points to approach the curve. The number of points $N_c$ can be from 20 to 80. In the preferred example of the invention, the number of points is preferably 40, and the contour model can be represented by the following mathematical equation:

$$C = \{(x_1, y_1), \ldots, (x_{N_c}, y_{N_c})\} \quad (3)$$

The method of calculating a contour matching score can be expressed by the following mathematical equation:

$$\text{Gradient Value Summation} = \sum_{i=1}^{N_c} \nabla \times I_2(x_c + x_i, y_c + y_i) \quad (4)$$

The center of the contour model is superimposed onto each pixel in the search area, and the summation of corresponding gradient values along the contour model yielding the contour matching score of the $(x_c, y_c)$ pixel. In the matching process, the difference of the image intensities at both ends of the image edge is more significant, as a result, the corresponding image gradient value is greater, thus a larger summation result shows the fitting to the active contour model is better. In other words, the pixel $(x_c, y_c)$ is more likely the target position.

The template matching score is calculated by using the sum of absolute differences (SAD). If the template size is M×N, preferably 32×32 in the preferred example, the computing method can be expressed by the following mathematical equation:

$$SAD = \sum_{i=1}^{M-1} \sum_{j=1}^{N-1} |I_1(x+i, y+j) - T(i,j)| \quad (5)$$

The center of the template is superimposed onto each pixel in the search area. A smaller computation result of the absolute difference of the gray scale intensity between the template (T) and the corresponding area ($I_1$), and it shows that the area is more similar to the template. In other words, the pixel is more likely the target position.

After the scores of the contour matching and the template matching are obtained, the result is sent to the hybrid tracking algorithm unit 112. The most probable result is the pixel, which is corresponding to a higher contour matching score and a lower template matching score. This unit 112 uses the maximum and minimum scores corresponding to each pixel in the search area for the normalization of the scores, such that the values of the scores fall within a range of 0~1. The higher the contour matching and the template matching score is, the more likely is the pixel situated at the target position.

Figure 4:
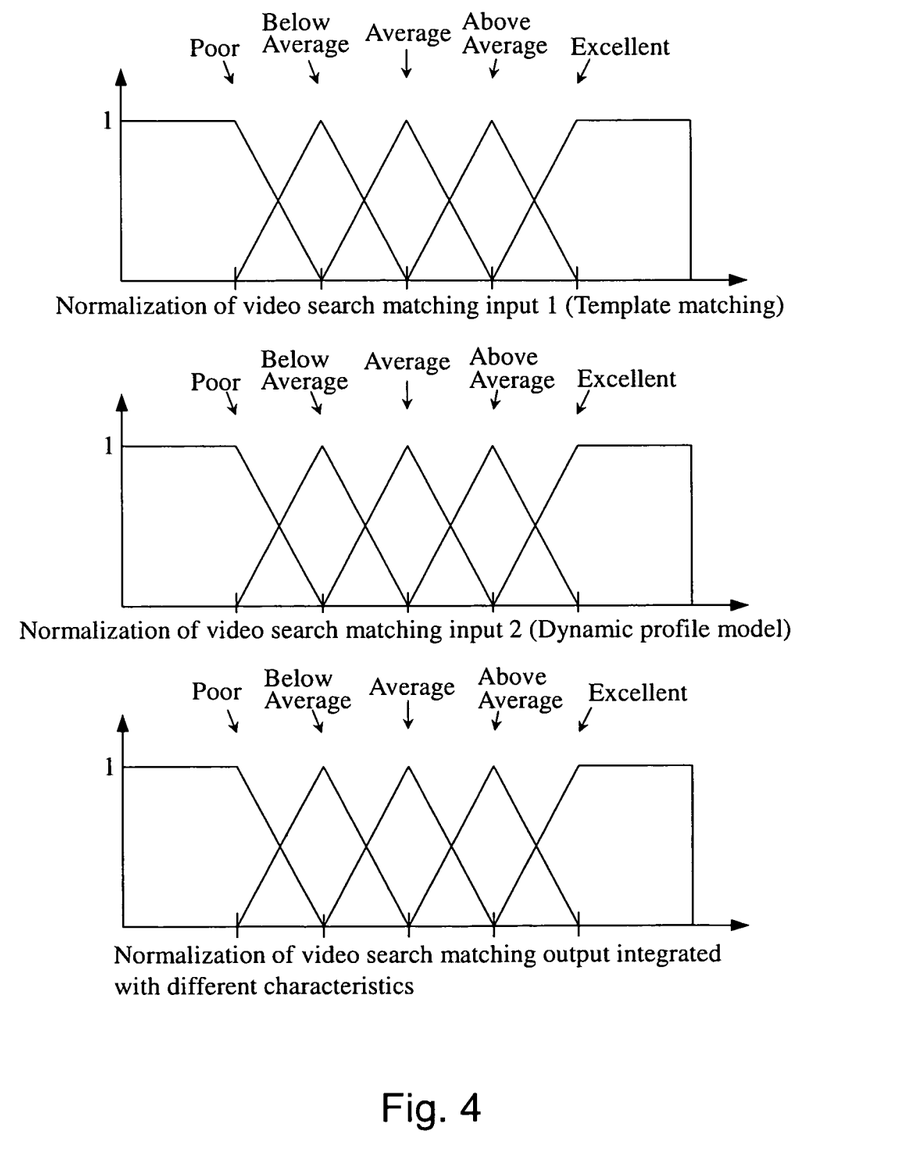
FIG. 4 shows a membership function for matching scores with a fuzzy theory in accordance with the preferred example of the invention.

Although the template matching is the most commonly used tracking method for computer vision, however, the camera cannot capture the complete appearance of the target if the object is occluded, and thus a tracking failure will occur. To overcome the shortcomings of the prior art that totally relies on the template matching, the present invention provides a method of integrating an active contour model, in such that when the target is partially occluded (such as the interior of the target or a portion of the contour is occluded), we can still track the target successfully. Although the active contour model provided for matching can handle the occlusion issue, but the image edge may not be obvious due to the insufficient illumination or the environmental factors. As a result, the tracking performance of the active contour model is affected adversely. Integrating the gray scale intensity with the active contour, cannot maximize their tracking capability, wherein the gray scale intensity and the active contour both have fixed weights. Thus the present invention uses a fuzzy theory to create a membership function for the contour matching score and the template matching score as shown in FIG. 4. In the figure, each matching score (x-axis) can use the membership function for the fuzzy computation to determine the levels of excellent, above average, average, below average or poor. After the template and contour matching scores go through the fuzzy computation, the outputted membership function as shown in Table 1 and FIG. 4 is used for the fuzzy computation to obtain the final matching scores. In a case having more than two image characteristics (such as adding a color characteristic), the membership function is also applicable. The purpose of the membership function is to compensate several characteristics with each other to obtain a more accurate and reliable tracking result. After the hybrid tracking algorithm unit 112 computes the probability of the target position for each pixel in the search area, the previous N optimal matching results (which can also be 1 to 16, and preferably 10 in this embodiment) are sent to the visual probability data association filter 114.

TABLE 1

| Normalization Image Search Matching Input Integrated with Different Characteristics | | Normalization Image Search Matching Input 1 (Template Matching) | | | | |
|---|---|---|---|---|---|---|
| | | Poor | Below average | Average | Above Average | Excellent |
| Normalization Image Search Matching Input 2 (Active Contour Model) | Poor | Poor | Below average | Average | Above Average | Excellent |
| | Below average | Below average | Below average | Average | Above Average | Excellent |
| | Average | Average | Average | Average | Above Average | Excellent |
| | Above Average | Above Average | Above Average | Above Average | Above Average | Excellent |
| | Excellent | Excellent | Excellent | Excellent | Excellent | Excellent |

Figure 5:
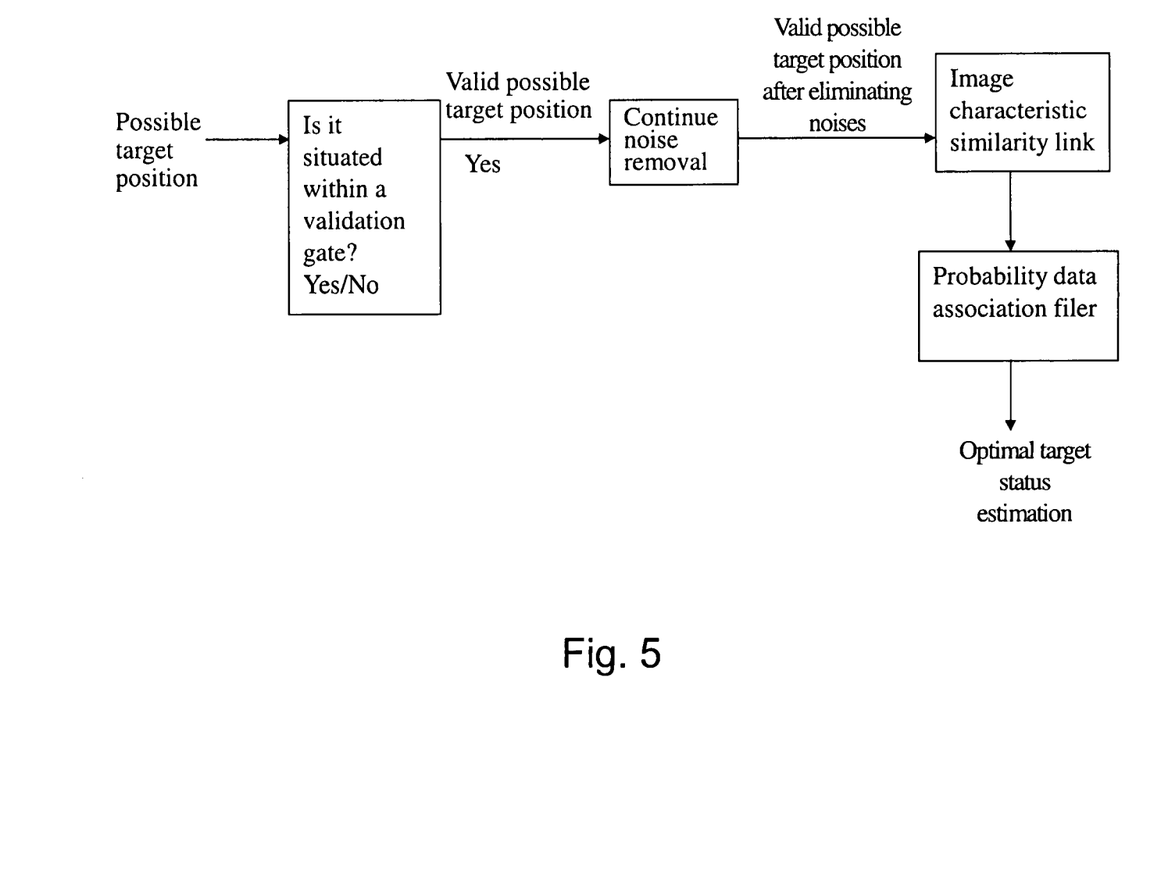
FIG. 5 shows a flow chart of operating a visual probability data association filter in accordance with the preferred example of the invention.

In the applications of computer vision, a complicated background significantly increases the difficulty, since the complicated background may contain an area having similar appearance to the target and large amount of edges, therefore, it can interfere both template matching and active contour model matching. It is the objective of the present invention to provide a visual probability data association filter 114 that can eliminate the complicated background, which affects the tracking effect adversely. The flow chart of the operation of the visual probability data association filter is shown in FIG. 5.

Firstly, the visual probability data association filter 114 receives ten optimal matching result positions from the hybrid tracking algorithm unit 112, and then the visual probability data association filter 114 uses a Kalman filter to estimate possible position and speed of the target at the current moment from the target position at the previous moment. Since the Kalman filter is a time domain filter and involves recursions, thus it is not necessary to save the target trajectory completely, and its low computational complexity fulfills the requirement of a real-time system. The Kalman filter predicts a possible position of the target at the current moment, and determines a possible range (also known as a validation gate) of the target according to the covariance matrix. Any matching result falling outside the validation gate will be deleted. The speed of the target estimated by the Kalman filter is used for determining whether or not the target is motionless. If the target is moving, then the motionless characteristic of the similar area in the background is used for eliminating the interference. In other words, a displacement between the target position falling within the validation gate and the possible target position at the current moment is calculated. If the displacement is smaller than a noise threshold (which is selected iteratively, since the target position at the previous moment and the target possible position at the current moment vary with time), which is determined by an iterative threshold selection scheme, then the target position will be produced by a motionless background with interference, and the interference will be deleted. Therefore, the interference caused by any similar area of the target in the background can be eliminated and this method is called "Persistent Noise Removal."

The purpose of the iterative threshold selection scheme is to determine whether the target position selected by the validation gate is produced by a moving object or a motionless background. Assumed that the number of target positions is $m_k$, and the target position and the target possible position estimated by the target position at the previous moment are subtracted to obtain a displacement, and its minimum value is used as the displacement between the target position and the target possible position at the current moment, and the calculation is given below:

$$d_i(k) = \min \| z_i(k) - z_j(k-1) \|, \qquad (6)$$

$$i = 1, \ldots, m_k, \; j = 1 \ldots m_{k-1}$$

$z_i(k)$ represents all possible target positions situated within a validation gate at a time k, and $z_j(k-1)$ represents all possible positions of a target passing through the visual probability data association filter at time k−1, and $d_i(k)$ represents a displacement of a target in an image, and the minimum displacement between $z_i(k)$ and all possible target positions of a target passing through the visual probability data association filter at the previous moment is used for the representation.

The size of $d_i(k)$ and the iterative threshold selection scheme are used to determine whether or not the target position is produced in a motionless background, and the determination includes the following four steps:

(1) Assume that any one of the target positions is produced in a motionless background, and the rest of the target positions are produced by a moving object, and threshold $T^0 = 0$ (2) Compute $$\mu_{st}^t = \frac{\sum_{i \in Still} |d_i(k)|}{\text{Number \# produced by still background}}$$

$$\mu_{nst}^t = \frac{\sum_{i \in moving} |d_i(k)|}{\text{Number \# produced by moving object}}$$

$$T^{t+1} = \frac{\mu_{st}^t + \mu_{nst}^t}{2}$$

(3) Assumed that $T^{t+1}$ is the current threshold, all possible target position are re-determined, the determination method is given below:

$$\begin{cases} \text{If } |d_i(k)| < T^{t+1}, \text{ it belongs to a still background,} \\ \quad \text{or else it belongs to a moving object} \end{cases}$$

(4) If $T^{t+1} \neq T^t$, then repeat Step (2), or else set $T^{t+1}$ as the iterative threshold, namely the noise threshold, to determine whether or not the target position is generated by the moving object.

Therefore, the inference caused by a similar area of the target in the background can be eliminated. Finally, the product of the image matching score and the estimation error of visual probability data association filter 114 is used as the weight to obtain a weighted average of all possible matching results filtered by the threshold and find the final tracking result, and then the visual probability data association filter 114 outputs a tracking signal.

Figure 6:
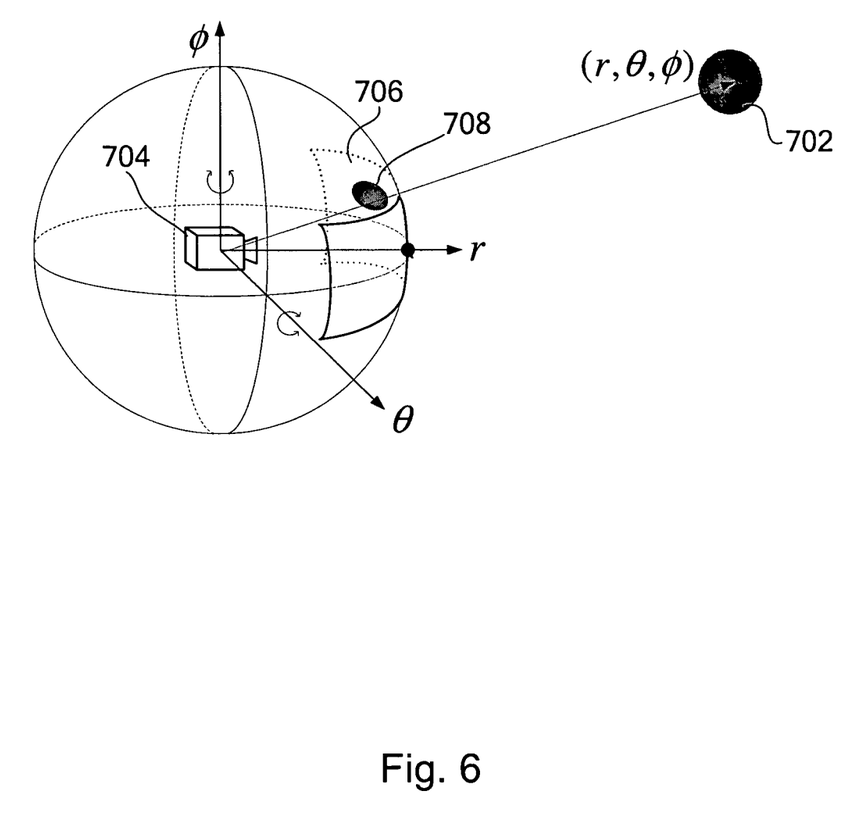
FIG. 6 shows the relation between image coordinates and camera coordinates in accordance with the preferred example of the invention.

The system formulates a moving strategy of the active moving platform 104 according to the tracking signal to lock the target at the center of the image, and the system uses a coordinate transformation to obtain a target position in the real world with respect to the camera, and the relation between the image coordinates and the camera coordinates is shown in FIG. 6. In other words, the included angle between a straight line connecting the target 702 and the center of camera 704 and the optical axis "r" is equal to the included angle between a straight line connecting a target position 708 on an image plane 706 of the target 702 and the center of the camera 704 and the optical axis "r". With this relation, the system of the invention can determine the moving angle in pan and tilt directions of the active moving platform 104, and the horizontal motor 106 and the inclined motor 108 are driven according to the determination result. After the active moving platform 104 is moved, the system will continue tracking according to the target model as shown in the flow chart of FIG. 2 until the target position exceeds a physical limit of the active moving platform 104. Then, the active moving platform 104 will return to a predetermined position, and prepare for tracking the next intruding target entering into the monitored scene.

In summation of the description, the present invention complies with the patent application requirements and enhances the performance over the prior art by recording the detailed maximum information of a target intruding a video security system, so as to timely tracking the target and also integrating a plurality of image characteristics to reinforce each characteristic, such that when the target is partially occluded and/or has a low image contrast, the camera can still track the target successfully and timely.

While the invention has been described by means of specific embodiments, numerous modifications and variations could be made thereto by those skilled in the art without departing from the scope and spirit of the invention set forth in the claims.

What is claimed is:

1. A visual tracking system, for generating a tracking result signal of a target, allowing an active moving platform to move according to the tracking result signal, and thereby positioning the target at an image center, the visual tracking system comprising:

a sensor unit for capturing images of a monitored scene consecutively;

an image processor unit, coupled to the sensor unit, for detecting whether a target is entering the image, extracting characteristics from the image to formulate at least two models of the target, and calculating a matching score of the models;

a hybrid tracking algorithm unit, coupled to the image processor unit, for using a fuzzy theory to create a membership function for the matching score of the models, and using the membership function for the fuzzy computation to determine the levels of excellent, above average, average, below average or poor, and performing a defuzzification for the fuzzy computation to obtain the final matching scores, and computing the probability of the target position for each pixel in the monitored scene to produce an optimal matching result; and a visual probability data association filter, coupled to the hybrid tracking algorithm unit, for receiving the optimal matching results to remove an interference of tracking from a complicated background and output the a tracking result signal, wherein the membership function is a triangular membership function (trimf), and the fuzziness degrees are referred to as excellent, above average, average, below average, and poor, respectively.

2. The visual tracking system of claim 1, wherein at least two images are captured continuously.

3. The visual tracking system of claim 1, wherein at least one model can be a contour model, a color model or a gray scale intensity value model.

4. The visual tracking system of claim 1, wherein the image processor unit uses a binarization method and morphological method to determine when there is a target entering into the image.

5. The visual tracking system of claim 4, wherein the binarization method and morphological method are used to process a subtraction result of gray scale intensity values of two successive images, and the morphological method is used to obtain a connected component.

6. The visual tracking system of claim 5, when a threshold of pixel number of the connected component is greater than 400, then an indication of the target is shown.

7. The visual tracking system of claim 1, wherein, before creating at least one model of the target the image processor unit creates a search area centered at the position of the target positioned at an earlier one of two consecutively captured image.

8. The visual tracking system of claim 7, wherein the model includes a template model and an active contour model.

9. The visual tracking system of claim 8, wherein the image processor unit is used to calculate a matching score of the template model by using an equation of the sum of absolute differences $$\sum_{i=1}^{M-1}\sum_{j=1}^{N-1}|I_1(x+i,y+j)-T(i,j)|,$$

and the template size is M×N, and T is the gray scale intensity of the template area, and I1 is the gray scale intensity of the corresponding search area.

10. The visual tracking system of claim 9, wherein the template size M×N is 32×32.

11. The visual tracking system of claim 8, wherein the image processor unit computes matching scores of the active contour model by an equation of gradient value summation $$\sum_{i=1}^{N_\sigma}\nabla\cdot I_2(x_c+x_i,y_c+y_i),$$

where $I_2$ denotes a gray scale intensity of each pixel in the search area and relative to the center of the active contour model, and $N_\sigma$ is the number of sampling points where the gradient operator is denoted by $\nabla$, pixel coordinates by $(x_c, y_c)$, and coordinates of other pixels along the active contour model by $(x_c+x_i, y_c+y_i)$.

12. The visual tracking system of claim 11, wherein the number of sampling points is 40.

13. The visual tracking system of claim 1, wherein the visual probability data association filter is based on a Kalman filter.

14. A visual tracking method for generating a tracking result signal of a target, allowing an active moving platform to move according to the tracking result signal, and thereby positioning the target at an image center, the visual tracking method, comprising the steps of:

(a) capturing images consecutively in a monitoring control scene by a sensor unit to determine whether a target is entering and obtain an initial position of the target;

(b) extracting a characteristic from the image to create at least one model of the target, and calculating the matching scores of the model;

(c) using a fuzzy theory to create a membership function for the matching score of the models, using the membership function for the fuzzy computation to determine the levels of excellent, above average, average, below average or poor, performing a defuzzification for the fuzzy computation to obtain the final matching scores, computing the probability of the target position for each pixel in the monitored scene to produce an optimal matching result; and (d) using the optimal matching result to eliminate an interference of tracking a complicated background and output the tracking result signal.

15. The visual tracking method of claim 14, wherein the step (a) further comprises the steps of:

(1) using the sensor unit to continuously capture at least two images in a monitored scene;

(2) using a binarization method and a morphological method to process the images to obtain a connected component;

(3) determining when the pixel number of the connected is greater than a threshold of the connected component, it indicates that a target enters into the monitored scene; and (4) performing an intersection for a first binary image processed by the morphological method and an edge detection result of a second image to obtain an initial location of the target.

16. The visual tracking method of claim 15, wherein the step (2) further comprises the step of subtracting gray scale intensity values of two successive images to obtain a binary result, and using a morphological method to obtain a connected component.

17. The visual tracking method of claim 15, wherein the threshold of the connected component in the step (3) is 400.

18. The visual tracking method of claim 14, wherein the step (b) further comprises the steps of:
(1) creating a search area centered at the position of the target positioned at an earlier one of two consecutively captured images;
(2) formulating a template model;
(3) initializing an active contour model;
(4) calculating a matching score of the template model; and
(5) calculating a matching score of the active contour model.

19. The visual tracking method of claim 18, wherein the matching score of the template model is calculated by using an equation of sum of absolute differences $$\sum_{i=1}^{M-1}\sum_{j=1}^{N-1}|I_1(x+i,y+j)-T(i,j)|,$$

and the template size M ×N is 32×32, and T is the gray scale intensity of a template area, and I1 is the gray scale intensity corresponding to a search area.

20. The visual tracking method of claim 18, wherein the matching score of the active contour model is calculated by using an equation of gradient value summation $$\sum_{i=1}^{N_\sigma}\nabla\cdot I_2(x_c+x_i,y_c+y_i),$$

$I_2$ denotes a gray scale intensity of each pixel in the search area and relative to the center of the active contour model, and a number of sampling points is denoted by $N_\sigma$, the number of sampling points being 40 where the gradient operator is denoted by $\nabla$, pixel coordinates by $(x_c, y_c)$, and coordinates of other pixels along the active contour model by $(x_c+x_i, y_c+y_i)$.

21. The visual tracking method of claim 14, wherein the step (d) further comprises the steps of:
(1) estimating a possible position and speed of the target positioned at later one of two consecutively captured images according to the position of the target positioned at an earlier of the two consecutively captured images, using in the optimal matching result and a Kalman filter;
(2) determining a possible range of the target position according to a covariance matrix and deleting the target position falling outside a validation gate;
(3) using an iterative threshold selection scheme to calculate a displacement between the target position falling within the validation gate and the target possible position falling within the validation gate, and deleting the target position if the displacement is smaller than a noise threshold; and
(4) outputting a tracking signal.

* * * * *